United States Patent [19]

Dodson et al.

[11] Patent Number: 5,029,104
[45] Date of Patent: Jul. 2, 1991

[54] PRESTAGING OBJECTS IN A DISTRIBUTED ENVIRONMENT

[75] Inventors: George W. Dodson, Colleyville; Michael O. Mitchell, Trophy Club, both of Tex.

[73] Assignee: International Business Machines Corporation, Armonk, N.Y.

[21] Appl. No.: 312,223

[22] Filed: Feb. 21, 1989

[51] Int. Cl.$^5$ .................. G06K 15/00; H04B 17/00
[52] U.S. Cl. .................. 364/514; 364/200; 364/239; 364/239.1; 364/239.4; 364/260; 340/825.5; 358/141
[58] Field of Search .............. 364/514, 516, 200, 900; 340/825.5, 825.51, 825.52; 358/141, 142; 370/79, 84, 95.1

[56] References Cited

U.S. PATENT DOCUMENTS

| 4,466,059 | 8/1984 | Bastian et al. | 364/200 |
| 4,593,324 | 6/1986 | Ohkubo et al. | 364/514 |
| 4,713,780 | 12/1987 | Schultz et al. | 364/514 |
| 4,727,495 | 2/1988 | Cheetham et al. | 364/514 |
| 4,750,135 | 6/1988 | Boilen | 364/514 |

Primary Examiner—Parshotam S. Lall
Assistant Examiner—Brian M. Mattson

[57] ABSTRACT

A distributed processing system includes a host and at least one connected work station. At the host there are included heuristic logic circuits which respond to information objects received at the host to determine the likelihood of use of each such object by the work station. Information objects likely to be used at the work station are voluntarily transmitted by the host to the work station prior to a request being made by the work station.

21 Claims, 4 Drawing Sheets

PRESTAGING OBJECTS IN A DISTRIBUTED ENVIRONMENT

BACKGROUND OF THE INVENTION

The present invention relates to distributed processing and more particularly to interchange of data in a communication system having one or more host processors connected for cooperative interaction with a plurality of intelligent terminals or work stations.

Cooperative processing is well known in the art, illustrative of which are systems such as those depicted in FIG. 1 hereof, wherein a host processor is operative in a purely reactive mode to requests for objects (data and processing routines) requested by the connected terminal/work stations. While such systems provide substantial economies of equipment by providing for the sharing of selected computational features at a consolidated level, (i.e. at a host processor) they nevertheless require two flows of information for each item communicated from the host to a connected terminal/work station:

(1) The initiation of a request at the work station communicated over a data link to the host; and (2) Data generated or otherwise produced at the host and communicated over a data link back to the requesting terminal/work station.

When the host processor is busy, requests for information may await their turn in a queue, thereby resulting in significant delays. Moreover, even if there is no queue, and the request for data is responded to immediately upon receipt, there nevertheless is a loss of time occasioned by the need for the requesting terminal to transmit a request to the host together with loss of time involved in production of requested data and their communication by the host back to the terminal over the connecting link. Moreover, it is desirable further to improve the efficiency of time and equipment utilization in systems of the type described herein in order to provide an anticipatory mode within the host computer whereby the host anticipates the need at the work stations of certain types of data and or processing information (hereinafter referred to as "objects") and to voluntarily provide the same to the work stations so that objects are available at the work stations for utilization (display/processing) immediately upon request by the user, thereby substantially improving time efficiency and equipment utilization.

OBJECTS AND FEATURES

It is one general object of this invention to improve distributed data processing systems.

It is another object of this invention to improve time efficiency in utilization of intelligent work stations.

It is another object of this invention to improve efficiency of equipment utilization in distributed processing systems.

It is yet another object of this invention to facilitate utilization of the equipment and attendant productivity of equipment user personnel.

Accordingly, in accordance with one feature of the invention, heuristics are provided within the host processor to screen objects and anticipate the need for such objects at work stations, thereby eliminating the necessity, at least for thus selected objects, for the user or work station to request them from the host.

In accordance with another feature of the invention, anticipatory data (also referred to herein as prestaged data or objects) are transmitted from the host to one or more selected terminals at optimal times, e.g., when the host processor is not otherwise engaged, thereby improving efficiency of utilization.

In accordance with still another feature of the invention, several objects may be selected for transmission from the host and transmitted as a group, thereby eliminating the need for a plurality of data/overhead items (e.g. re-starting transmission and identifying user), thereby further improving efficiency of equipment use.

In accordance with yet another feature of the invention, selected objects are retained in storage (e.g. memory or DASD) at the local terminal/work stations until either: 1. a predetermined period of time has passed without their being used; or 2. until the available storage at the terminal/work station is full and a higher priority item seeks entry thereto These and other objects and features of the invention will be apparent from the following detailed description, by way of preferred embodiment, with reference to the drawings.

DETAILED DESCRIPTION OF THE INVENTION

Figure 1:
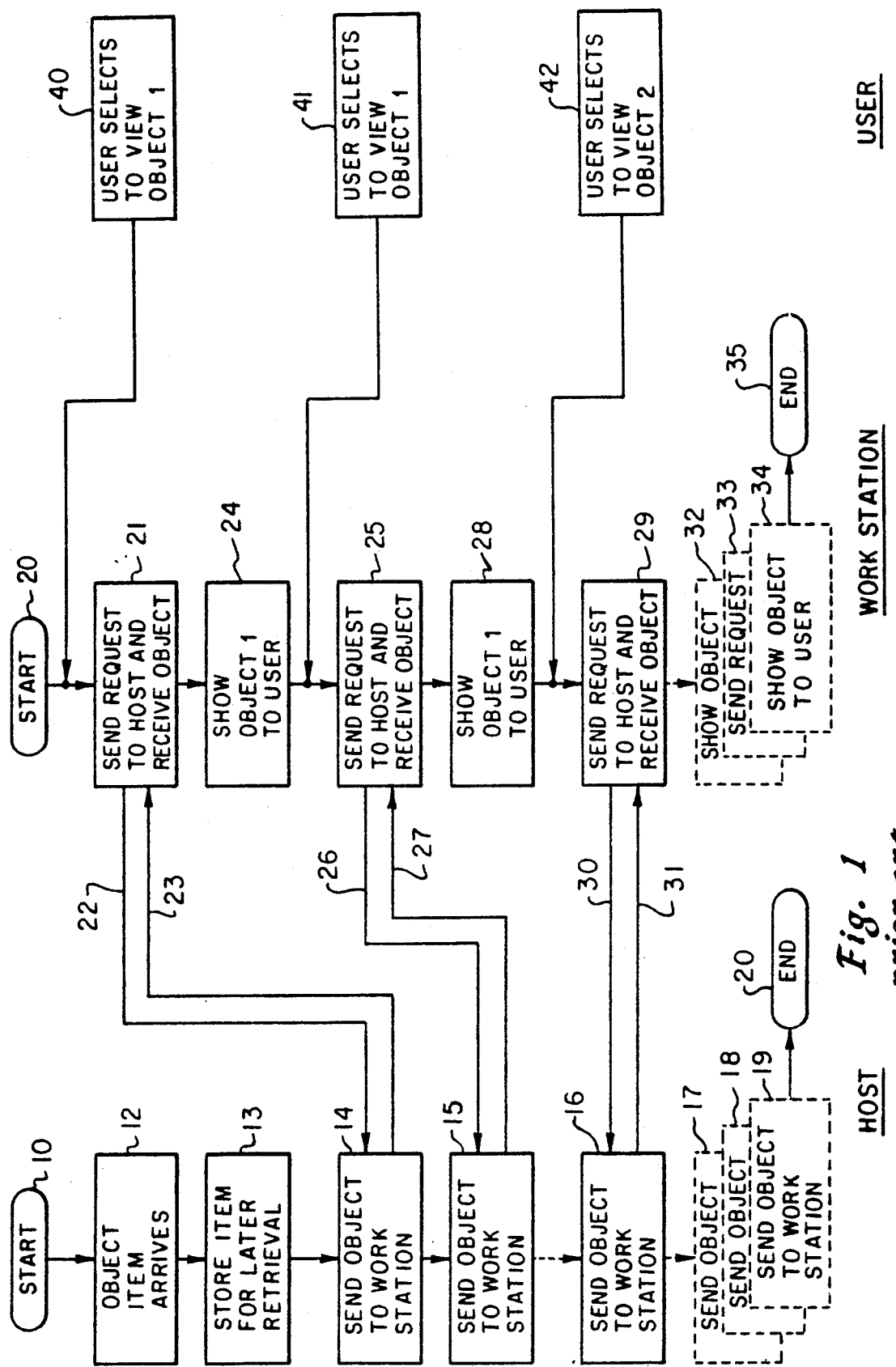
FIG. 1 is a flow chart illustrating operative principles embodied in the prior art.

Referring now to FIG. 1, a typical distributive processing system according to the prior art is illustrated. Steps progress operatively in descending order from top to bottom and represent, by vertical column, the host processor, terminal/work station and user respectively. As will be observed from the top of the host column, action begins with starting of the host system and the terminal/work station(s) respectively. These actions are represented by start symbols 10 and 20. In this connection, it should be observed that reference to terminal and/or work station when used in the singular is intended to include the plural and vice versa unless the context requires otherwise.

Once the system is activated, objects are received at the host as represented by the descriptor "object item arrives", symbol 12. This is accomplished in accordance with heretofore generally known techniques in equipment of the prior art. After arrival, the object item is stored at the host for later retrieval when a request is subsequently received from the user for such item.

When a user elects to view the object, e.g. object 1 as noted by symbol 40, he or she makes an appropriate entry, normally by manipulation of a keyboard or the like; and in response thereto, the work station develops and sends to the host a request for the object as denoted by symbol 21. Upon receiving such an input, the work station circuits transmit a request for the object over communication link 22 to the host processor with a request that the identified object be sent to the work station. This then is accomplished as represented by communication link 23, and the work station equipment accepts the requested object and then displays it to the user as noted by symbol 24. The item may be temporarily retained at the work station until the memory capacity is needed for the next item. Ordinarily, however, the item is not retained in storage at the work station and consequently must be recalled again from the host if it is to be viewed subsequently. This is represented by the sequence beginning with selection by the user to view the object as denoted by symbol 41. Circuits in the work station are then activated as denoted by symbol 25 and act in the manner similar to that denoted by symbol 21 to send a request to the host over transmission path 26 to circuits in the host which responds as noted by symbol 15 to send the requested object to the work station over communication link 27. The object is then displayed to the user as denoted by symbol 28.

Should the user desire to view a different object (e.g. object 2) a procedure similar to the foregoing is employed, with the user electing to view the object 2 as denoted by symbol 42 to send a request to the host and receive the object as denoted by symbols 29, 30, 31 and 16. Other similar sequences of operation are represented by symbols 17, 18 and 19 at the host station and by symbols 32, 33 and 34 at the work station. Completion of the foregoing sequences or deactivation are denoted by symbols 20 and 35.

From the foregoing, it will be observed that in accordance with the prior art, the system is entirely reactive; that is, the host does not take the initiative to voluntarily or anticipatorily send objects to the work stations but awaits receipt of a request before doing so. Moreover, it will be observed that after display of the object or utilization thereof by the work station, the object is not stored there but is retained at the host, thereby requiring subsequent individual retrievals of the object from the host for use or display.

Figure 2:
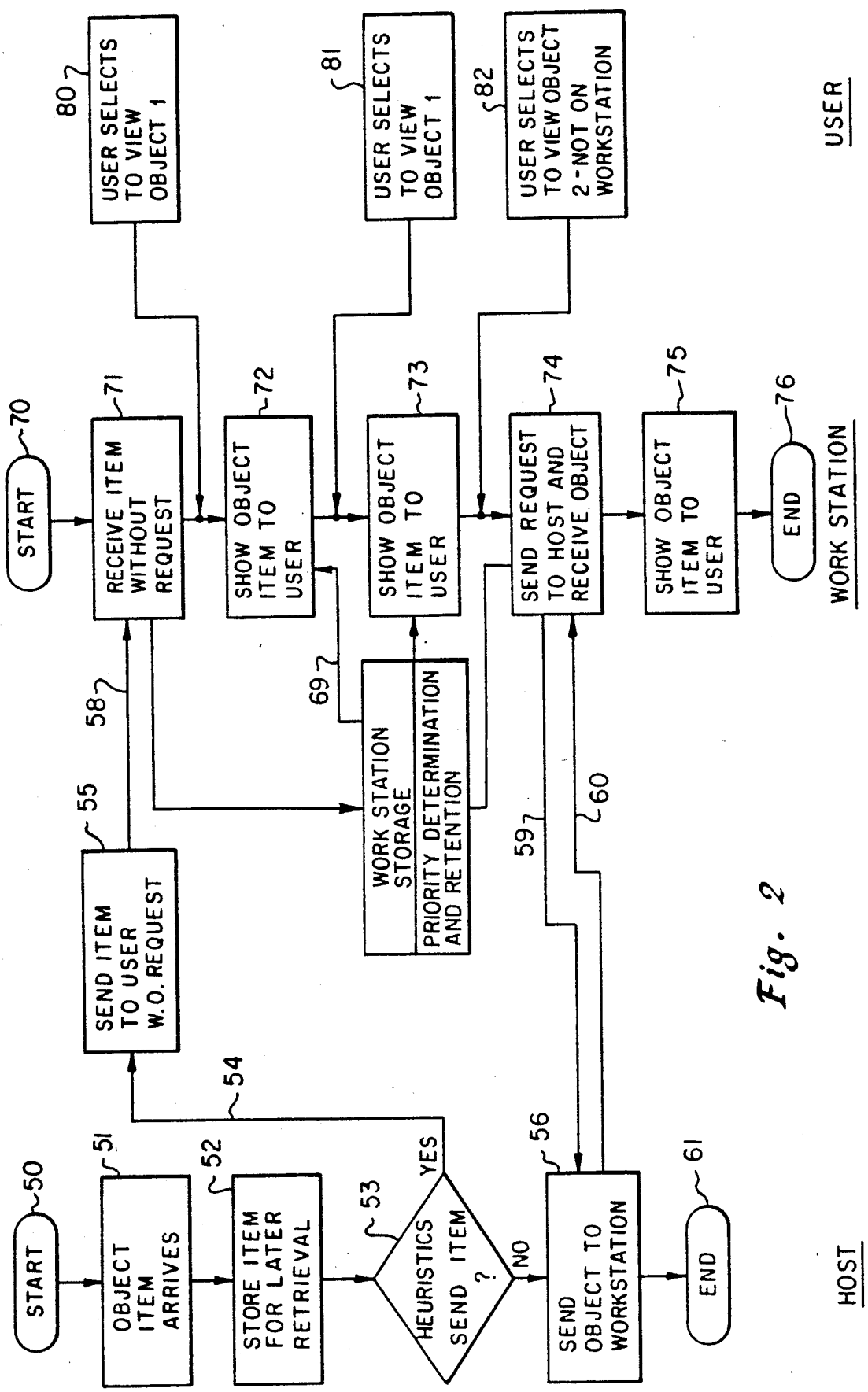
FIG. 2 is a flowchart illustrating the preferred embodiment of the invention.

Now turning to FIG. 2, it will be observed that the present invention is illustrated therein. As with the prior art, the inventive system includes a host and one or more work stations These are presented in a form similar to that of FIG. 1 and are activated by start-up which is indicated by symbols 50 and 70 respectively. As with the case of the prior art, objects are received and are represented by "object item arrives", symbol 51. The items are then stored in host storage 52. Next, without waiting for a request from a work station, the heuristic logic circuits 53 identify the item. However, after such identification, in contrast with the prior art systems, heuristic logic circuits 53 then either determine that the item is not to be voluntarily sent to a work station as noted by the word "no" at the base of diamond 53, or that it is to be sent as noted by the word "yes" which appears adjacent path 54. If the answer is "no", then the object simply remains in storage 52 and is available for later retrieval and transmission as noted by rectangle 56; if "yes", then the object is sent to a work station as noted by link 54, rectangle 55 and link 58. Thus, the system is effective to voluntarily send selected ones of the objects to one or more predetermined work stations as represented by symbol 71, without any request from a work station as represented by symbol 55.

The host is conditioned to respond to a specific request from a work station and to send the object to the work station as represented by symbol 56. Communication between the circuits 53, 55 and 56 and the corresponding work station circuits of 71 and 74 is effected over communication links 58, 59 and 60. Deactivation of the host system is of course, represented by "end" symbol 61.

As will be evident to those skilled in the art, link 54 is a logic path rather than a communication path. However, path 54 may also be considered to represent communication of data within the host so that it can be transmitted over communication link 58 to one or more work stations.

As mentioned above, circuits at the work stations are equipped with sufficient storage capacity to store and retain objects ordinarily desired and/or used by the work station operators. Accordingly, after a item has been received by circuits 71, it is stored in storage 77 (which is symbolic of storage at each work station) where it remains until, because of inactivity or need for replacement by an object of higher priority, it is erased therefrom. Paths interonnecting circuits 71, 72, 73 and 74 with storage 77 are identified by communication paths 68, 69, 78 and 79.

As shown in FIG. 2, displays of requested objects, e.g. mail, to the user are identified by symbols 72, 73 and 75. Of course, it will be evident to those skilled in the art that these are representative of a number of different showings of the same or different objects.

Completion of a sequence of actions or eventual deactivation of the system is denoted by symbols 61 and 76 in the conventional manner.

Again as evident from inspection of FIG. 2, a work station user may select to view an object that is either currently resident within local storage 77 or which must be summoned from the host. Symbols 80 and 81 represent selection by the work station user to view one or more objects resident in storage 77, whereas, symbol 82 identifies selection by the user of viewing an object which is currently not in work station storage 77, but which must be summoned from the host processor. Thus, in accordance with a feature of the invention, dual modes of operation are provided whereby the user can select items that are currently either in the local storage and host storage or in the storage of the host and wherein the local storage memory normally contains objects which are most likely to be selected by the user in accordance with the principles hereinafter described.

Communication link 79 is provided to show that when a user selects to view a given object, he may not know whether it is in local storage 77 or must be summoned from the host. Accordingly, before a request is made to the host, local storage 77 is first checked via link 79. This link 79 is also used to store the object once it has been obtained from the host.

Figure 3:
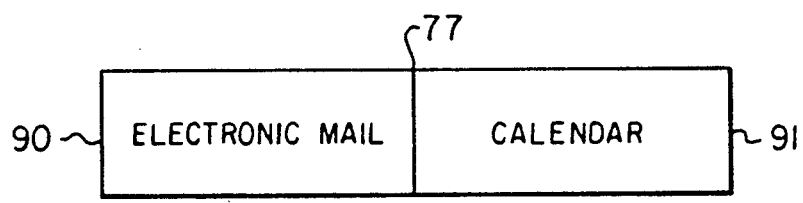
FIG. 3 is a diagram identifying two types of information for which the principles of the invention are particularly useful.

FIG. 3 illustrates two categories of objects which many users would like to maintain. These are electronic mail and calendar. Accordingly, at least a portion of storage 77 is allocated for storing information of these two categories. Other objects may also be included as, for example, those which are described in co-pending U.S. Pat. application Ser. No. 07/312,222, filed on even date herewith by the inventors hereof for "Asynchronous Staging of Objects Between Computer Systems in Cooperative Processing Systems".

Electronic mail 90 is provided for storage of selected items of mail which are newly arrived, designated by the users for retention, or are being maintained at the work station for a predetermined or indeterminate interval of time.

Calendar 91 designates information of a chronological nature such as schedules for meetings, appointments, holidays, travel and the like which the user finds necessary or useful in organizing, planning and conducting his activities.

As described above, the electronic mail storage 90 is adapted to store for a predetermined or indeterminate period of time such items as have been selected for storage by the work station. In order to prevent overflow and loss of desirable data, a system of priority hierachies is established within the work station circuits in accordance with known techniques so as to identify items which may be displaced to make room for newly arrived information. Thus, when an item of information newly arrives, and there is insufficient space to store the new item, the item furthest down in the order of priority is bumped in order to make room for storage of the new item, thus insuring at all times that the latest and highest priority items are retained in the electronic mail storage 90.

In accordance with establishing the hierarchy of priorities, the most recently arrived item is accorded first priority, provided that it does not occupy more than a predetermined amount of storage. Should the item exceed a permitted storage limitation, an indication may be provided to the user; and, after displaying the item and its use within the memory of the work station, the item is discarded from the work station. On the other hand, if the item meets the storage requirements, it then is stored in electronic mail storage segment 90 without displacing any other information if sufficient unoccupied storage exists. However, if there is insufficient unused storage, then one or more items of the greatest age and lowest retention priority are displaced and erased from memory 90.

Returning now to the establishment of priorities, after newly arrived items, there are those which are utilized on a frequent basis at the work station. Following these, are those which are infrequently used, and last of all are those which have not been utilized at all during a predetermined interval.

As an optional alternative feature, the order of priorities may include the feature by which when an item is used, it is advanced either to the head of the queue or a predetermined higher position therewithin.

As mentioned above, the calendar section 93 is dedicated to the storage of items that are forward looking and time dependant. Because the user is more likely to look at the current week, and another week or two in advance, the calendar is specially adapted for storing and updating information covering that period. Thus, the calendar is adapted for the establishment of a time priority which includes a sliding window of predetermined duration, e.g. two to three weeks (or longer, at the discretion of the user) into which calendar information is introduced and retained, to which new items are added, and from which past items are deleted. It also optionally includes a feature by which selected future items lying outside of the window can be separately stored for capture within the window when the window has advanced to that point chronologically.

Figure 4:
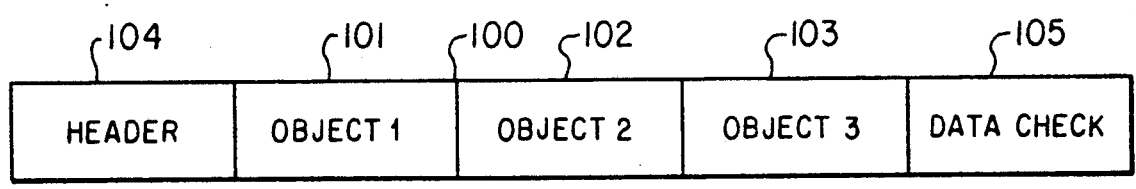
FIG. 4 is a diagram illustrating a block of information and the advantage of communicating groups of data objects.
Figure 5:
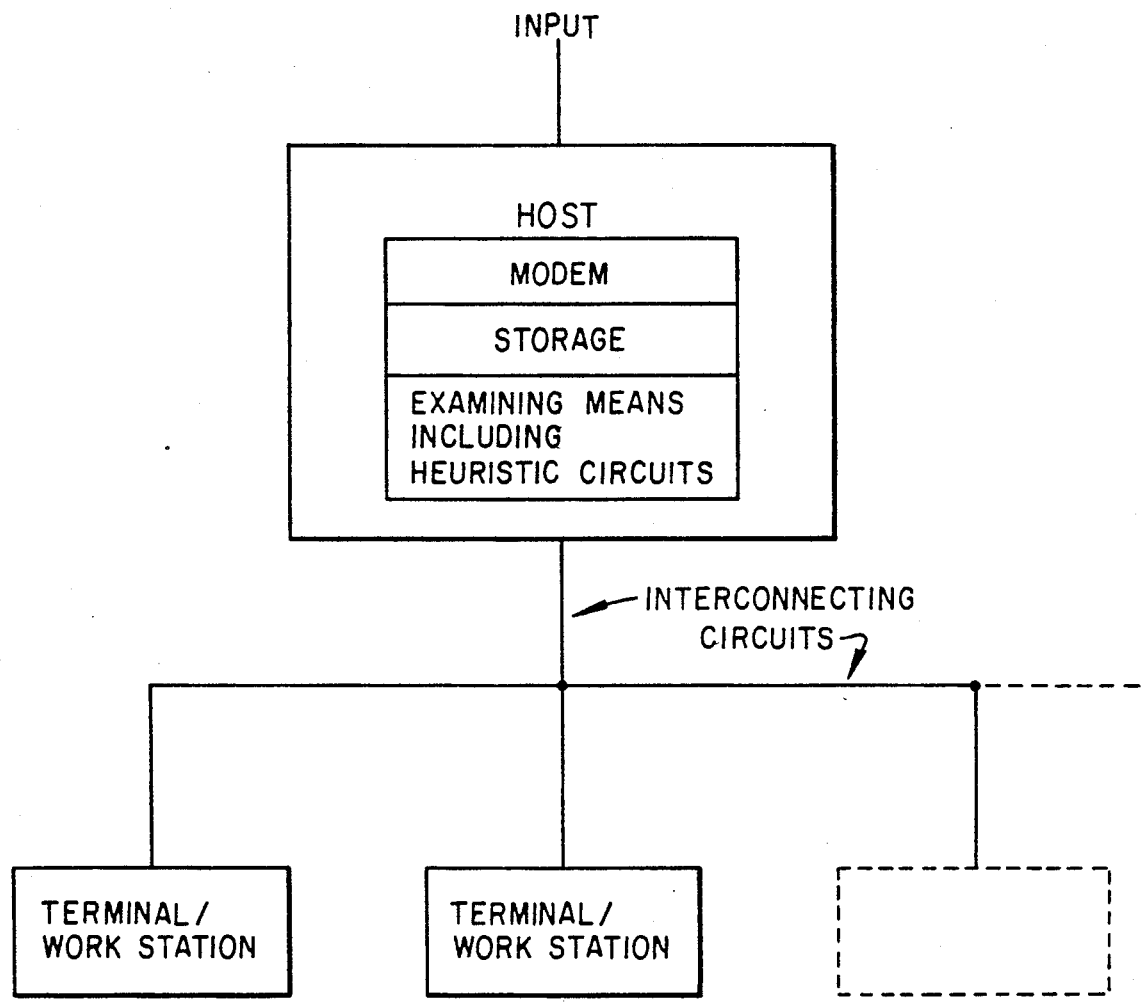
FIG. 5 is a block diagram of the system in accordance with the invention.

Turning to FIG. 4, another feature of the invention is illustrated. Here, it will be observed there is identified a block of information 100 which, for purposes of illustration, includes 3 objects, 101, 102, and 103, a header packet 104 and a data check packet 105.

As mentioned above, one of the features hereof is the provision for transmitting more than one object from a host to a terminal storage as part of one incident in order to achieve increased efficiency through the use of but one set of overhead items, (e.g. header 104 and data check 105).

As mentioned above, through the utilization of communication during times when the host is otherwise unoccupied (or at other predetermined times at the discretion of the host manager), batches of information, such as that represented by symbol 100, can be transmitted and thus achieve the efficiencies inherent in such batch communication.

In summary, through the anticipatory heuristics described herein, a pre-staging system is provided which includes a host and plurality of work stations that are substantially improved in efficiency by virtue of the voluntary or anticipatory transmission of objects in accordance with the prediction of the needs or desires of the user, thus substantially increasing speed of operation and efficiency in use of time and equipment.

It will now be evident that what has been described herein is a distributed processing system having substantially improved features. Although the inventive concepts hereof have been illustrated by way of a preferred embodiment, it will be evident to those skilled in the art that other adaptations and modifications may be employed without departing from the spirit and scope of the invention. Thus, for example, other types of memory allocations could be identified and provided in addition to those of electronic mail and calendar.

The terms and expressions herein employed are used as terms of description and not of limitation, and there is no intent in the use thereof to exclude equivalents, but on the contrary it is intended to include any and all equivalents, adaptations and modifications that can be employed without departing from the spirit and scope of the invention as described in the specification and claims herein.

What is claimed is:

1. A distributed processing system having a host processor, a work station connected to said host processor, means for receiving data objects into said host processor, heuristic means in said host processor for predicting likelihood of use at said work station of different data objects, examining means in said host processor including said heuristic means for examining each of said data objects and for determining whether said each of said data objects is likely to be used at said work station, and transmitting means interconnected with said host processor and responsive to said examining means for voluntarily transmitting to said work station those of said data objects which said heuristic means determines is likely to be used at said work station.

2. The distributed processing system according to claim 1 further including storage means at said host processor for storing selected ones of said data objects.

3. The distributed processing system according to claim 1 further including work station storage means for storing at said work station selected ones of said data objects which said heuristic means determines is likely to be used at said work station.

4. The distributed processing system according to claim 3 in which said work station includes priority determination means for determining priorities of retention in said work station storage means of objects stored therewithin.

5. The distributed processing system according to claim 4 in which said priorities of retention in said work station storage means are effective to accord first priority of retention to the one of said data objects most recently received at said work station provided said most recently received object does not exceed a predetermined quantity of data.

6. The distributed processing system according to claim 4 in which said priorities of retention in said work station storage means are effective to accord first priority of retention to the one of said data objects most recently received at said work station.

7. The distributed processing system according to claim 4 in which said priorities of retention in said work station storage means are effective to accord last priority of retention to the most remotely used, as to time, object stored therewithin.

8. The distributed processing system according to claim 4 in which said priorities of retention in said work station storage means are effective to change the priority of an object according to the amount of use of said object at said work station.

9. The distributed processing system according to claim 4 in which said priorities of retention in said work station storage means are responsive to the use of an object to position the most recently used object to a predetermined high priority level.

10. The distributed processing system according to claim 4 in which said priorities of retention in said work station storage means are responsive to the use of an object to position the most recently used object to a predetermined higher priority level.

11. The distributed processing system according to claim 4 in which said priorities of retention in said work station storage means are effective to delete from said work station storage means objects which have not been used during a predetermined interval of time.

12. The distributed processing system according to claim 11 in which said predetermined interval of time is the most remote, as to time, interval of time.

13. The distributed processing system according to claim 1 further including host processor storage means for storing selected ones of said data objects and further including work station storage means for storing selected ones of said data objects which said heuristic means determines is likely to be used at said work station.

14. The distributed processing system according to claim 1 in which said transmitting means is effective to transmit data objects to said work station only when said host processor has not been called upon to perform other tasks.

15. The distributed processing system according to claim 1 in which said work station includes priority determination means for determining priorities of retention at said work station of objects received by said work station.

16. The distributed processing system according to claim 1 in which said voluntary transmitting is conducted in groups of objects.

17. A method of interacting a host processor with a connected work station including the steps of receiving at said host processor a plurality of data objects, examining each of said data objects, determining which of said data objects are likely to be used at said work station, transmitting to said work station prior to request from said work station those objects likely to be used at said work station, and storing at said work station selected ones of those objects received at said work station.

18. The method according to claim 17 further including the step of establishing within said work station a hierarchy of retention priorities for retaining stored objects at said work station.

19. The method according to claim 17 further including the step of storing said plurality of data objects at said host processor.

20. The method according to claim 17 further including the step of transmitting to said work station any object stored at said host processor and requested by said work station from said host processor.

21. The method according to claim 17 wherein said step of transmitting to said work station prior to request from said work station those objects likely to be used at said work station is performed only during times when said host processor is not otherwise busy.

* * * * *